Jan. 25, 1927.
T. MIDGLEY
1,615,474
TIRE MOLD
Filed June 5, 1925
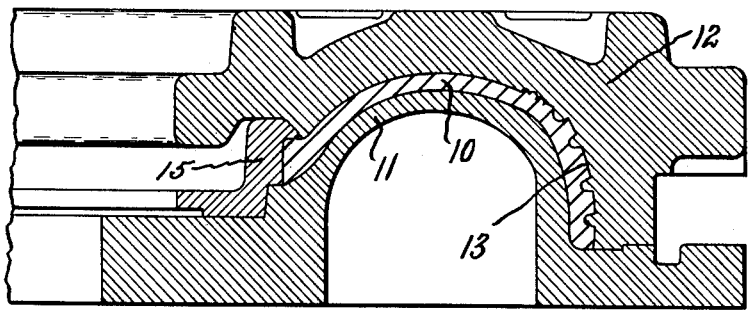
Fig. 1.
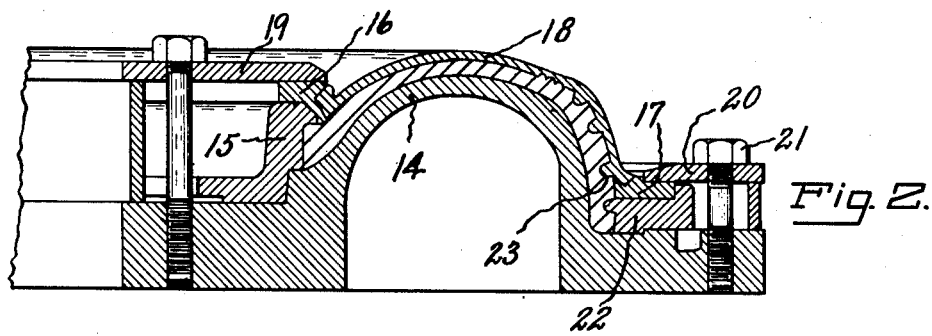
Fig. 2.
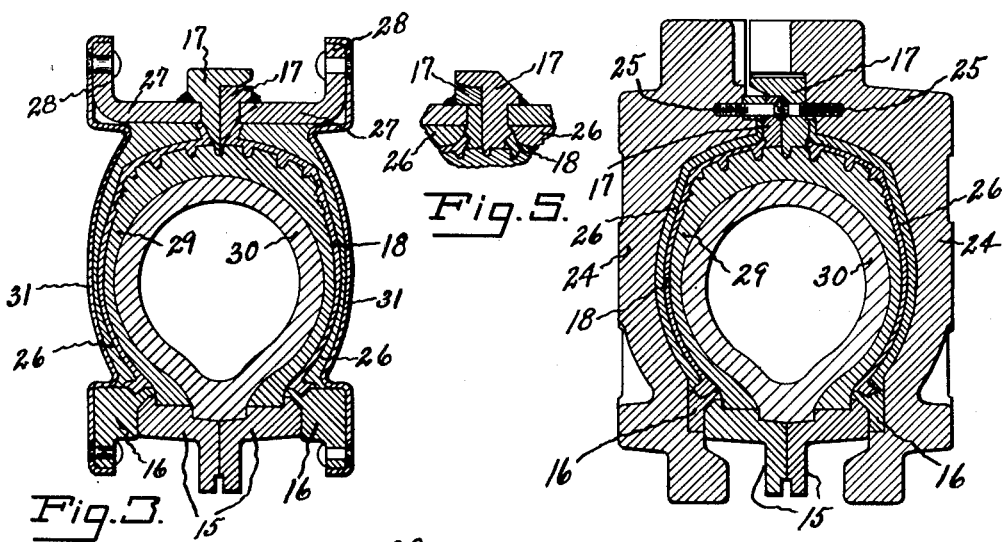
Fig. 3.
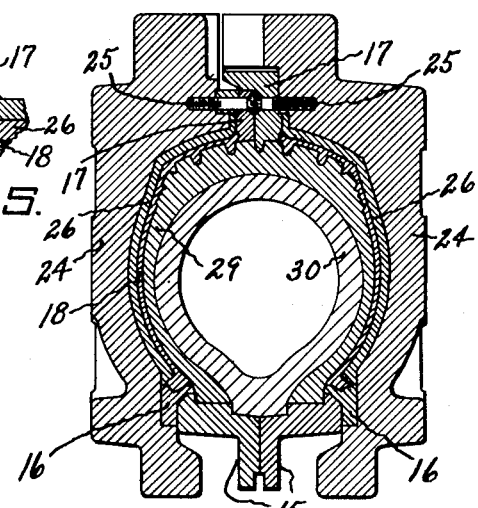
Fig. 4.
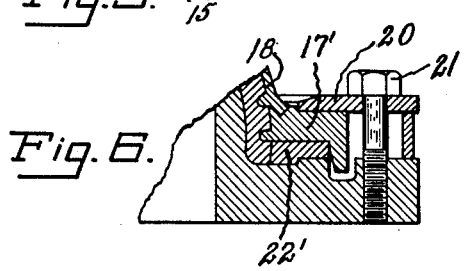
Fig. 6.
Fig. 5.
INVENTOR.
Thomas Midgley
BY
Edward V. Taylor
ATTORNEY.

Patented Jan. 25, 1927.

1,615,474

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed June 5, 1925. Serial No. 35,035.

This invention relates to molds adapted for use in the vulcanization of tire casings, and to a method by which such molds may be advantageously manufactured. The invention is particularly directed to the solution of the problem of obsolescence of mold equipment due to a change in the tread pattern or lettering on the mold. One object of the invention is to provide a mold in which the surface carrying the design is readily replaceable. Another object is to provide a mold making method in which the tread design and lettering is produced without the necessity for machine work. Other objects will appear from the description and claims.

Referring to the drawings,

Fig. 1 is a section illustrating one manner of preparing a flexible matrix for use in forming molds according to this invention;

Fig. 2 is a section illustrating one manner of forming the portion of the mold which is to contact with the tire;

Fig. 3 is a section of one form of mold with a tire enclosed in it;

Fig. 4 is a similar section of another form;

Fig. 5 is a detail of a modification; and

Fig. 6 is a sectional detail showing the preparation of the half of the mold now shown in Fig. 2.

The mold forming the present invention is composed of a molding surface, a frame or casing adapted to receive and transmit the mold closing pressure, and a backing interposed between the molding surface and the casing to hold them rigidly together at all times. This backing is preferably of such a character as to be readily removable where desired, and thereby permit replacement of the molding surface with another of a different design without destroying the mold casing.

The first step to be considered in the making of such a mold is the formation of the molding surface. This may be built up in various ways, that preferred being by electrodeposition, or by metal spraying, upon a matrix made flexible so as to be readily removable. This matrix may be formed of rubber as indicated in Fig. 1, where a layer of rubber 10 is cured into the form of the matrix desired by pressure between an interior core 11 and a mold 12, into the surface of which the desired tread pattern 13 and sidewall lettering has been machined. The engraving of this one mold is all of that class of work that needs to be done, no matter how many molds of that type are to be made. The details of construction of the mold are not of especial importance, as long as the matrix formed presents a surface which is substantially half that of the tire to be molded.

After the matrix 10 has been formed and set by vulcanization, it is removed from the mold and placed upon a core 14 similar to core 11, being held in place at the inner edge by a bead ring 15 of the usual form. Adjacent the bead ring 15 is placed a ring 16 formed to the shape desired for the mold at this point and furnishing a rigid edging of fixed dimensions for the weaker material which is to form the molding surfaces of the mold to be constructed. A ring 17 of different dimensions but with a similar purpose is placed at the outer periphery of the matrix. Bridging these two rings, upon the surface of the matrix and partaking of all the design and lettering carried over by the matrix from the original mold, is now built up a layer of metal 18. Various ways of producing this metal layer may be adopted. For instance, the matrix may be covered with a conducting substance such as powdered graphite and the metal coating formed by electrodeposition. An alternative way is to spray the metal onto the matrix by a commercial process in which wire is fused by a high temperature flame and blown against the matrix by a blast of air. During this part of the process the rings 16 and 17 are conveniently held to the core by clamp rings 19 and 20 and bolts 21. The ring 17 is shown as spaced from the core by a ring 22 (Fig. 2). In the formation of the other mold half, as illustrated in Fig. 6, the ring 17 is replaced by a ring 17' adapted to interfit with it when the two mold halves are assembled, and the ring 22 is correspondingly replaced by a ring 22'.

After the formation of the metal layer 18 the clamps and core are removed and the matrix pulled away. The matrix must be made of flexible material in cases where the tread design is provided with indentations such as 23, which would prevent a rigid matrix being stripped from the encircling layer of metal. Rubber, being readily molded and very flexible, is the best for this purpose. After the rubber matrix has been removed the sheet 18, attached at its inner and outer circumferences to rings 16 and 17, is ready for incorporation in the framework or body member which gives it support in use.

In the case shown in Fig. 4 the body members are cast iron or steel mold halves 24, similar to those of ordinary tire molds except that the inner cavity is made large enough to permit the sheets 18 to be received loosely. Rings 17 have been shown as secured to the mold halves as by screws 25, and similar provision may be made for rings 16 if desired. After the sheets 18 have been placed in position the space between them and the mold halves is filled with molten material 26. This material, of which lead or some of the solder alloys may serve as examples, should have a melting point lower than that of the sheet 18 or the metal of the mold half, but higher than the temperature of vulcanization so that it will not become soft in use. The melted filling material may be introduced through suitable holes leading at various points into the interior of the mold halves.

When the molten material has set, the mold is ready for use in the usual manner. If, at any time, it is desirable to change the mold pattern or the lettering, it is only necessary to melt the backing 26 and remove the molding surface 18. The mold may now be reassembled with a corrected molding surface, and the former one stored if desired until its use is again required. The bulky part of the mold is always kept in use, and, the molding surfaces being once prepared, no machine work is required to change molds from one design to another.

In Fig. 3 this principle has been shown as adapted to molds or sheet metal construction. The form of the rings 16 and 17 has been changed, but their function has been preserved. The rings 17 are shown welded directly to rings 27 having thrust receiving flanges 28 for receiving pressure to hold the mold closed during the expansion of the tire 29 by the pressure bag 30. Side plates 31 of sheet metal are held to rings 27 and to rings 16 by riveting or welding, and the molten material 26 is filled in as before. Fig. 5 shows a slightly different form of rings 17, adapted likewise for the sheet steel type of mold.

Having thus described my invention, I claim:

1. A tire mold having a replaceable molding surface, comprising a thin metal facing having the desired tread pattern and lettering formed thereon in intaglio, an outer casing, and a filling of fusible material interposed between the facing and the casing and joining them together.

2. A two part tire mold having a replaceable molding surface, comprising a pair of mating metal facings shaped to conform to the tire and having the desired tread pattern and lettering formed thereon in intaglio, a pair of mating outer casings, and a filling of fusible material interposed between each casing and its facing and joining them together.

3. A two part tire mold having a replaceable molding surface, comprising a pair of mating metal facings shaped to conform to the tire and having the desired tread pattern and lettering formed thereon in intaglio, rings permanently secured to said facings at their inner and outer peripheries, a pair of mating annular casings into which said facings and rings fit, and a filling of fusible material interposed between each casing and its facing and joining them together.

THOMAS MIDGLEY.